United States Patent
Geater et al.

(10) Patent No.: US 12,177,332 B2
(45) Date of Patent: Dec. 24, 2024

(54) DATA BLOCK MODIFICATION

(71) Applicant: RKVST LIMITED, Beverley (GB)

(72) Inventors: Jonathan Geater, Cambridge (GB); Mansoor Ahmed-Rengers, Cambridge (GB)

(73) Assignee: RKVST Limited, Beverley (GB)

(*) Notice: Subject to any disclaimer, the term of this patent is extended or adjusted under 35 U.S.C. 154(b) by 0 days.

(21) Appl. No.: 18/119,739

(22) Filed: Mar. 9, 2023

(65) Prior Publication Data
US 2023/0216661 A1    Jul. 6, 2023

Related U.S. Application Data

(62) Division of application No. 17/087,007, filed on Nov. 2, 2020.

(30) Foreign Application Priority Data

Nov. 8, 2019  (GB) ..................... 1916291

(51) Int. Cl.
*H04L 9/00* (2022.01)
*H04L 9/06* (2006.01)
(Continued)

(52) U.S. Cl.
CPC .......... *H04L 9/0643* (2013.01); *H04L 9/0637* (2013.01); *H04L 63/00* (2013.01); *H04L 67/1097* (2013.01); *H04L 9/50* (2022.05)

(58) Field of Classification Search
CPC ....... H04L 9/3247; H04L 9/3239; H04L 9/50; H04L 2209/68; G06F 21/64
See application file for complete search history.

(56) References Cited

U.S. PATENT DOCUMENTS 9,846,718 B1 * 12/2017 Ruef ..................... G06F 3/0641
2018/0253452 A1 * 9/2018 Callan ....................... H04L 9/14
(Continued)

OTHER PUBLICATIONS

Intellectual Property Office, Search Report under Section 17(5), issued for Application No. GB1916291.6, mailed Aug. 26, 2020 (4 pages).

(Continued)

*Primary Examiner* — Kevin Ayala
(74) *Attorney, Agent, or Firm* — Polsinelli PC; Derek D. Donahoe

(57) ABSTRACT

A method of modifying a data block of a data structure comprising a plurality of linked data blocks comprising: receiving a selection of said a data block comprising block data; creating modified block data; transmitting a request to a plurality of validator devices over a network, the request comprising a modification record and requesting permission to modify the data block in accordance with the modified block data; determining that consensus is reached by the plurality of validator devices that the data block can be modified in accordance with the modified block data; in response to the determining: modifying the data block in accordance with the modified block data; and adding a modification data block to the data structure, the modification data block comprising: the modification record and a cryptographic hash of a data block that precedes the modification data block after addition of the modification data block to the data structure.

17 Claims, 11 Drawing Sheets

(51) Int. Cl.
*H04L 9/40* (2022.01)
*H04L 67/1097* (2022.01)

(56) References Cited

U.S. PATENT DOCUMENTS

| | | | |
|---|---|---|---|
| 2019/0147065 A1 | 5/2019 | Maeda et al. | |
| 2019/0205558 A1* | 7/2019 | Gonzales, Jr. | ........ G06F 21/602 |
| 2019/0340169 A1 | 11/2019 | Shima et al. | |
| 2020/0084027 A1* | 3/2020 | Duchon | ................ G06F 21/602 |
| 2020/0382282 A1* | 12/2020 | Hudson | ................ H04L 9/3268 |
| 2021/0312444 A1 | 10/2021 | Liu | |

OTHER PUBLICATIONS

Ateniese, G. et al., Redactable Blockchain or Reqriting History in Bitcoin and Friends, 2nd IEEE European Symposium on Security and Privacy, EUROS&P, 2017 (38 pages).

* cited by examiner

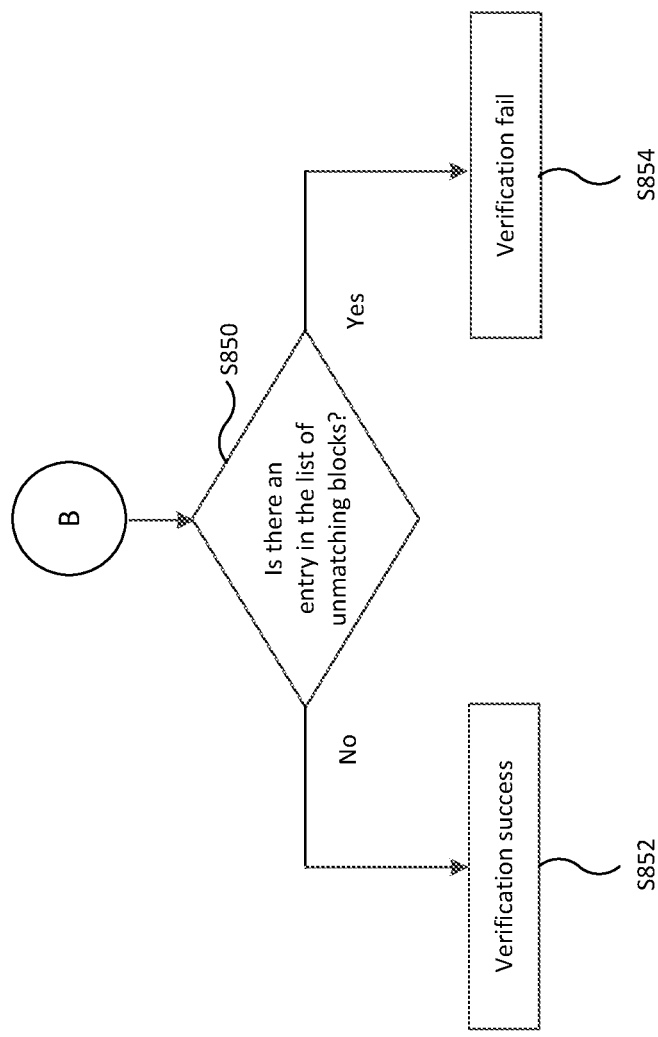

DATA BLOCK MODIFICATION

CROSS-REFERENCE TO RELATED APPLICATION

This application is a divisional of U.S. patent application Ser. No. 17/087,007 filed Nov. 2, 2020, titled "Data Block Modification," which is related to and claims priority from United Kingdom Patent Application No. 1916291.6 filed Nov. 8, 2019, titled "Data Block Modification," both of which are hereby incorporated by reference in their entirety.

BACKGROUND

Blockchains, and more generally distributed ledger technologies, are emerging as a fundamental building block of new digital communications platforms. The ability to securely store, trade, and compute data in a shared responsibility system with no single central point of authority is a very powerful architecture.

One of the most important and powerful features of a blockchain and other distributed ledger technologies is its immutability. That is, a blockchain provides a permanent, indelible, and unalterable history of data.

In a standard blockchain or cryptographic ledger the immutability and integrity of the chain is maintained through a chain of hashes: the cryptographic hash of each block stored in its successor so as to link them together and make it impossible to modify, add, or remove anything from a block in the chain.

SUMMARY

There are many legitimate reasons why it may be necessary to alter the contents of a blockchain. In a traditional blockchain implementation there are only 3 options: (1) leave the data there and face the consequences, (2) change the data and break the chain, or (3) go back to the block you want to change and manipulate the consensus mechanism to create and force a fork.

The inventors have identified that all of these options have significant downsides. In the prior art, depending on the design in use, the following problematic features are present: (i) the data simply cannot be changed; (ii) the data can be changed, but then the chain fails to verify from that point forwards (meaning none of the data can be trusted), or (iii) the data can be changed, and the chain's integrity data can be rebuilt, but then nobody knows the change was made, and every transaction after the one being changed has to be re-created, offering the possibility for additional (and also undetectable) changes to history.

In embodiments of the present disclosure there is provided a system which enables transactions to be modified (e.g. changed or redacted) with the following desirable properties: (i) the chain remains verifiable; (ii) the changed block is easily identifiable; (iii) the participants in creating the change are clearly identified; and (iv) the participants in creating the change are in the same security context as the participants in the consensus mechanism.

According to one aspect of the present disclosure there is provided a method of modifying a data block of a data structure comprising a plurality of linked data blocks, the method implemented on a computing device, and comprising: receiving a selection of said data block comprising block data; creating modified block data based on the block data and user input received at the computing device; transmitting a request to a plurality of validator computing devices over a communication network, said request comprising a modification record and requesting permission to modify said data block in accordance with the modified block data, wherein said modification record comprises (i) at least one data portion identifier of said block data, each of the at least one data portion identifier associated with a respective data portion of said data block modified in creating the modified block data; (ii) modification information; (iii) a cryptographic hash of said data block when comprising the block data; (iv) a cryptographic hash of said data block when comprising the modified block data; and (v) an integrity measure; determining that consensus is reached by the plurality of validator computing devices that said data block can be modified in accordance with the modified block data; in response to said determining: modifying said data block in accordance with the modified block data; and adding a modification data block to the data structure comprising the plurality of linked data blocks, the modification data block comprising: the modification record and a cryptographic hash of a data block that precedes the modification data block after addition of the modification data block to the data structure.

The modification information may comprise the modified block data. Alternatively, the modification information may comprise instructions on how to generate the modified block data.

The modification record may additionally comprise a block identifier associated with said data block.

The modification record additionally comprises a reason specifying why the data block is being modified.

The modifying the data block may comprise one or more of: redacting data in a data portion of said data block; deleting data in a data portion of said data block; replacing data in a data portion of said data block with replacement data; and adding new data to a data portion of said data block.

The integrity measure may comprise at least one digital signature. Additionally or alternatively, the integrity measure may comprise at least one Message Authentication Code. Additionally or alternatively, the integrity measure may comprise at least one cryptographic hash.

The modification data block may additionally comprise the modified block data.

The data structure comprising the plurality of linked data blocks may be stored in memory of the computing device.

The data structure may be structured in accordance with a distributed ledger technology. The distributed ledger technology may be blockchain.

According to another aspect of the present disclosure there is provided a computer-readable storage medium comprising instructions which, when executed by a processor of a computing device cause the computing device to perform the method steps described herein.

The instructions may be provided on a carrier such as a disk, CD- or DVD-ROM, programmed memory such as read-only memory (Firmware), or on a data carrier such as an optical or electrical signal carrier. Code (and/or data) to implement embodiments of the present disclosure may comprise source, object or executable code in a conventional programming language (interpreted or compiled) such as C, or assembly code, code for setting up or controlling an ASIC (Application Specific Integrated Circuit) or FPGA (Field Programmable Gate Array), or code for a hardware description language.

According to another aspect of the present disclosure there is provided a computing device for modifying a data block of a data structure comprising a plurality of linked data blocks, wherein the data structure is stored in memory accessible to the computing device, and the computing device comprising a processor configured to: receive a selection of said data block comprising block data; create modified block data based on the block data and user input received at the computing device; transmit a request to a plurality of validator computing devices over a communication network, said request comprising a modification record and requesting permission to modify said data block in accordance with the modified block data, wherein said modification record comprises (i) at least one data portion identifier of said block data, each of the at least one data portion identifier associated with a respective data portion of said data block modified in creating the modified block data; (ii) modification information; (iii) a cryptographic hash of said data block when comprising the block data; (iv) a cryptographic hash of said data block when comprising the modified block data; and (v) an integrity measure; determine that consensus is reached by the plurality of validator computing devices that said data block can be modified in accordance with the modified block data; in response to said determination: modify said data block in accordance with the modified block data; and add a modification data block to the data structure comprising the plurality of linked data blocks, the modification data block comprising: the modification record and a cryptographic hash of a data block that precedes the modification data block after addition of the modification data block to the data structure.

According to another aspect of the present disclosure there is provided a method of verifying a data structure comprising a plurality of linked data blocks, the method performed on a computing device, and comprising:

for a first data block at a beginning of the data structure:
computing a cryptographic hash of the first data block;
determining if the cryptographic hash of the first data block matches a cryptographic hash stored in a successor data block of the first data block, and if the cryptographic hash of the first data block does not match the cryptographic hash stored in the successor data block of the first data block, storing information associated with the first data block as an entry in a list stored in memory accessible by the computing device;
analysing each subsequent data block in the data structure after said first data block by: determining if said subsequent data block is a modification data block, wherein if said subsequent data block is not a modification data block, the method comprising: computing a cryptographic hash of the subsequent data block; determining if the cryptographic hash of the subsequent data block matches a cryptographic hash stored in a successor data block of the subsequent data block, and if the cryptographic hash of the subsequent data block does not match the cryptographic hash stored in the successor data block of the subsequent data block, storing information associated with the subsequent data block as an entry in said list;
wherein if said subsequent data block is a modification data block, the method comprising: verifying an integrity measure of the modification data block; if said verifying the integrity measure of the modification data block is successful, determining that information in the modification data block matches information of a matching entry in said list, and in response, removing said matching entry from said list; in response to completion of said analysing, successfully verifying the data structure based upon detecting that said list comprises no entries.

The method may comprises determining that verifying the data structure has failed if said verifying the integrity measure of the modification data block is unsuccessful.

In response to completion of said analysing, the method may comprise determining that verifying the data structure has failed upon detecting that said list comprises one or more entries.

According to another aspect of the present disclosure there is provided a computing device for verifying a data structure comprising a plurality of linked data blocks, wherein the data structure is stored in memory accessible to the computing device, and the computing device comprising a processor configured to: for a first data block at a beginning of the data structure: compute a cryptographic hash of the first data block; determine if the cryptographic hash of the first data block matches a cryptographic hash stored in a successor data block of the first data block, and if the cryptographic hash of the first data block does not match the cryptographic hash stored in the successor data block of the first data block, storing information associated with the first data block as an entry in a list stored in memory accessible by the computing device; analyse each subsequent data block in the data structure after said first data block by:

determining if said subsequent data block is a modification data block, wherein if said subsequent data block is not a modification data block, the processor configured to:
compute a cryptographic hash of the subsequent data block; and determine if the cryptographic hash of the subsequent data block matches a cryptographic hash stored in a successor data block of the subsequent data block, and if the cryptographic hash of the subsequent data block does not match the cryptographic hash stored in the successor data block of the subsequent data block, storing information associated with the subsequent data block as an entry in said list;
wherein if said subsequent data block is a modification data block, the processor is configured to: verify an integrity measure of the modification data block; if said verification of the integrity measure of the modification data block is successful, determine that information in the modification data block matches information of a matching entry in said list, and in response, remove said matching entry from said list;
in response to completion of said analysis, successfully verify the data structure based upon detecting that said list comprises no entries.

These and other aspects will be apparent from the embodiments described in the following. The scope of the present disclosure is not intended to be limited by this summary nor to implementations that necessarily solve any or all of the disadvantages noted.

BRIEF DESCRIPTION OF THE DRAWINGS

For a better understanding of the present disclosure and to show how embodiments may be put into effect, reference is made to the accompanying drawings in which:

FIGS. 8a-c is a flow chart of a process for verifying a blockchain comprising a modification block.

DETAILED DESCRIPTION

Embodiments will now be described by way of example only. In particular, whilst embodiments are described with reference to computing devices modifying data stored in a blockchain, embodiments extend to the modification of data that is stored in accordance with other distributed ledger technologies.

Figure 1:
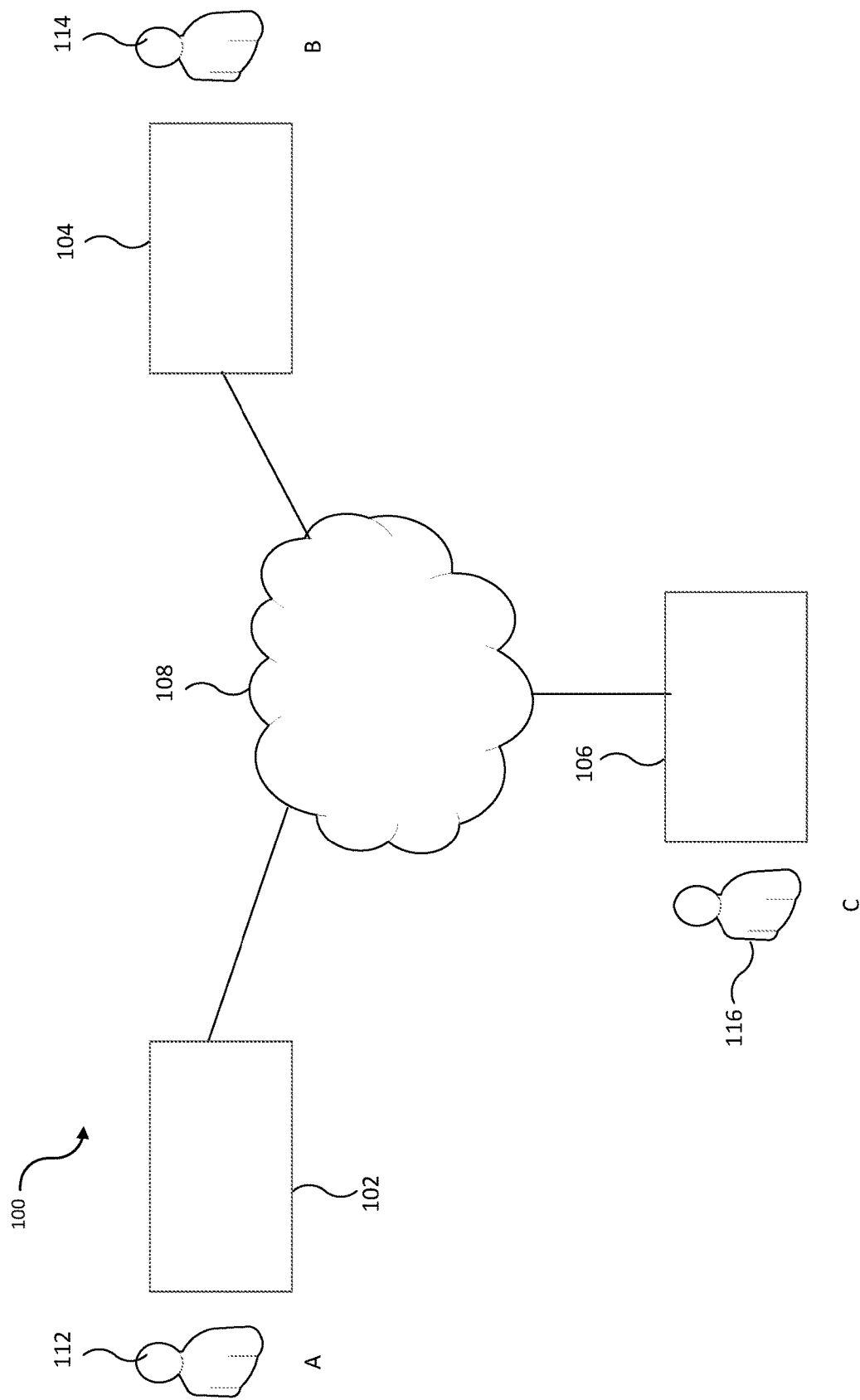
FIG. 1 is schematic block diagram of a communication system.

FIG. 1 illustrates a communication system 100 comprising a plurality of computing devices (also referred to herein as nodes) coupled to a network 108 (e.g. the Internet). For simplicity three computing devices are shown, comprising a first computing device 102 associated with user A 112, a second computing device 104 associated with user B 114 and a third computing device 106 associated with user C 116. Each of the computing devices 102, 104, 106 are configured to communicate data to each other over the network 108 so as to store data on a blockchain which is maintained in memory associated with each computing device, and are therefore referred to herein as participant nodes. It will be appreciated that many more participant nodes than that shown in FIG. 1 that involved in storing data on the blockchain, and the communication system 100 may comprise other computing devices coupled to the network 108 that are not participant nodes.

Each computing device is associated with a respective user. In one example, user B 114 may be an industrial machine manufacturer who manufactures a particular industrial machine, user A 112 may be a factory owner who has purchased the industrial machine, and user C 116 may be a worker of the factory who is required to performs checks on the industrial machine. In this example, each user uses their associated computing device to store data on a blockchain which is maintained in memory associated with each computing device. For example, user B 114 may upon manufacture of the industrial machine, store data on the blockchain such as model number, manufacture date, country of manufacture etc. and after software updates have been pushed to the industrial machine user B 114 may store data on the blockchain such as software upgrade version number, software upgrade etc. User A 112 upon purchasing the industrial machine may store data on the blockchain such as purchase date, supplier details, and after having the industrial machine serviced may store data on the blockchain such as name of servicer, date of service, results of service etc. User C 116 may upon performing checks on the industrial machine may store data on the blockchain such as a parameter of the industrial machine (e.g. operating temperature, speed, voltage etc.), date of check, name of person performing the check etc.

The network 108 may be any suitable network which has the ability to provide a communication channel between the computing devices. Each computing device may be, for example, a mobile phone, a personal computer ("PC"), a tablet, laptop, or other embedded device able to connect to the network 108. Each computing device is arranged to receive information from, and output information to, the user of the computing device.

Figure 2:
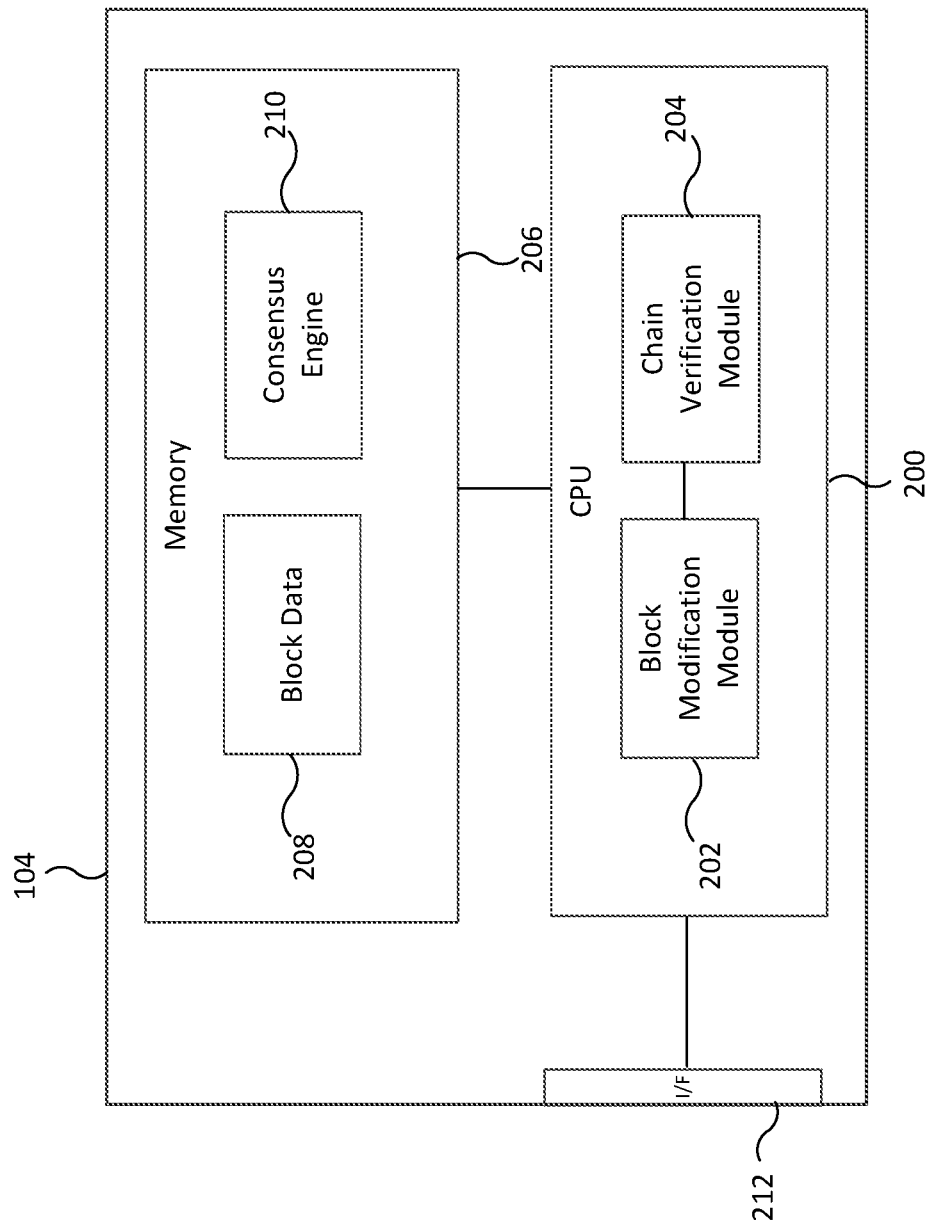
FIG. 2 is a schematic block diagram of a computing device in the communication system.

FIG. 2 illustrates a detailed view of a computing device (e.g. a computing device 104) in the communication system 100. The computing device 104 comprises a central processing unit ("CPU") 200, to which is connected a memory 206 and a network interface 212 for communication with the network 108. As shown in FIG. 2, the CPU 200 comprises a block modification module 202 and a chain verification module 204. As described in more detail below, the block modification module 202 is operable to add a modification block to a block chain. The chain verification module 204 is operable to verify a blockchain comprising a modification block.

A blockchain comprises blocks of data. The memory 206 is configured to store block data 208 comprising blocks of a blockchain. It will be appreciated that whilst FIG. 2 illustrates the computing device 104 storing the block data 208 locally, some or all of the block data 208 may be stored in one or more external storage devices (e.g. in cloud storage or in a remote storage device coupled to the computing device 104).

Whilst embodiments are described with reference to a blockchain, this is just one example of a distributed ledger technology in which embodiments of the present disclosure can be used in. In particular, the term "block" is used herein to refer generally to a sequence of bits or bytes storing data, which may be added to a data structure which is structured in accordance with a distributed ledger technology. It will be appreciated the format of the block and how it links to other blocks in the data structure will vary in dependence on the particular distributed ledger technology.

The memory also stores a consensus engine 210. The consensus engine 210 comprises instructions which when executed by the CPU 202 implement a consensus mechanism. The particular implementation details of the consensus mechanism may vary greatly, but in a general sense, the consensus mechanism defines how the consensus engine 210 knows how it will be convinced that a block is valid and should be added to the chain. In particular, the consensus mechanism defines how the consensus engine 210 knows to accept a block that originated from another computing device on the network, and how the consensus engine 210 can verify that a block created by the computing device 104 was accepted by the network (i.e. accepted by consensus nodes in the network).

A consensus node (also referred to herein as a validator computing device) is a computing device coupled to the network 108 which plays a role in determining whether a new block is to be accepted onto the blockchain. A consensus node may also be a participant node, however this is not essential and thus a consensus node may not also be a participant node. In implementations, the consensus nodes may correspond to one or more the participant nodes. In one implementation, the consensus nodes may correspond to the participant nodes (i.e. all of the participant nodes are also involved in the consensus of whether to accept a new block onto the blockchain that is stored by each of the participant nodes).

In embodiments of the present disclosure, any known consensus mechanism may be used by the consensus engine 210. Details of the particular consensus mechanism that is used by the consensus engine 210 falls outside the scope of the present disclosure, however the consensus mechanism typically falls into one of the below types:

- all the authorized validator computing devices are somehow known to the consensus engine 210, and when the consensus engine 210 is checking, it can see who and how many of the validator computing devices have approved the new block. When enough of the validator computing devices have approved the new block (e.g., a predetermined number of validator computing devices have approved the new block or a predetermined percentage of the total validator computing devices have approved the new block) the consensus engine 210 accepts the new block.
- the consensus engine 210 does not know all the authorized validator computing devices but instead stores sufficient data and code to re-create (from first principles) some mathematical or cryptographic puzzle that proves that they all know the same secret, or are working together, or similar.

Although not shown in FIG. 2, the computing device 104 may comprise an input device such as a keypad, a touch-sensitive display, and/or a microphone. The computing device 104 may also comprise an output device such as a display (which may be touch-sensitive) and/or speakers.

The computing devices 102 and 106 of the other participants of the blockchain also store their own copy of the blocks of the blockchain in memory associated with the device.

Figure 3:
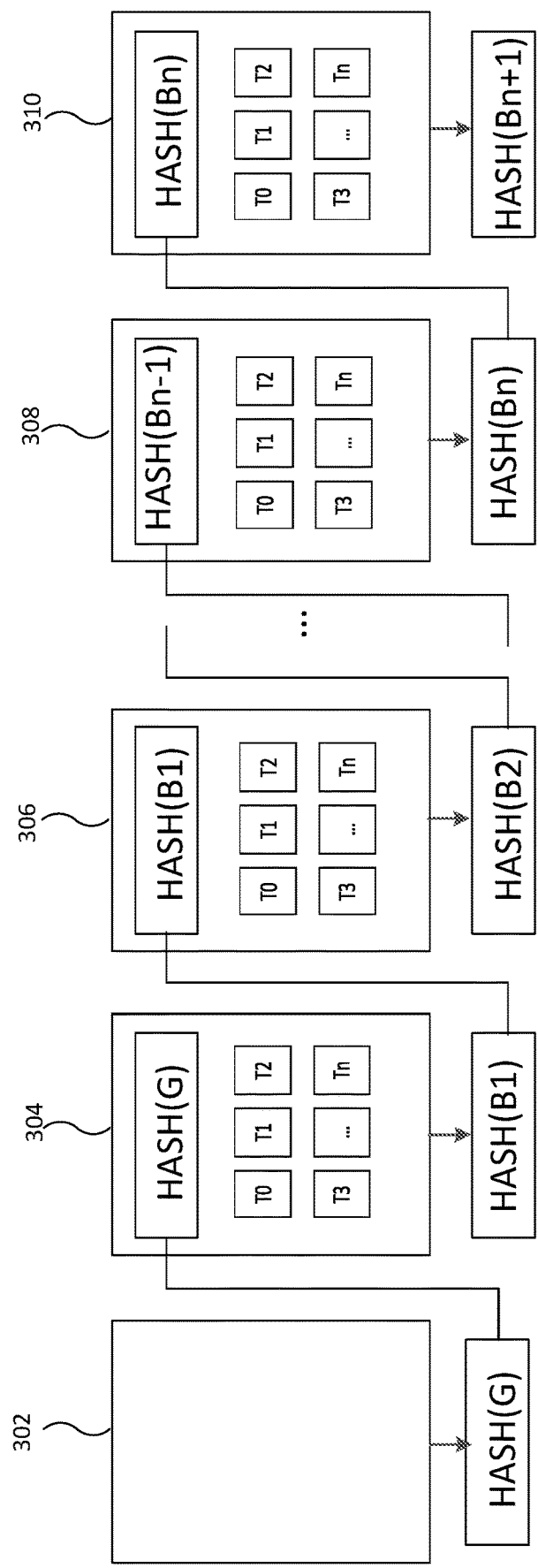
FIG. 3 illustrates the known composition of a blockchain.

FIG. 3 illustrates the known linear data structure of a blockchain. At the beginning of the blockchain there is a genesis block 302. As shown in FIG. 3, each block comprises at least one portion of data (labelled as T0-Tn), commonly referred to as transactions. Each block that follows the genesis block 302 comprises the cryptographic hash of the preceding block (referred to herein as a linking hash). For example, as shown in FIG. 3, block 1 (B1) 304 comprises the cryptographic hash, HASH (G)—a linking hash, of the preceding block (the genesis block 302). Similarly, block 2 (B2) 306 comprises the cryptographic hash, HASH (B1)—a linking hash, of the preceding block (block 304). Expressed another way, the cryptographic hash of each block is stored in its successor.

The manner in which a blockchain is constructed means that it is impossible to modify, add, or remove anything from a block that has been committed to the chain. This is so because the 'nodes' (participants) in reaching consensus and validating the chain recalculate the hash of each block and discard/revoke any that don't match. Any change to the data (usually 'transactions') in a block changes its cryptographic hash, and so breaks the chain. With the chain's integrity broken, nobody can trust the data in the modified block or any subsequent block. This is illustrated in FIG. 4.

Figure 4:
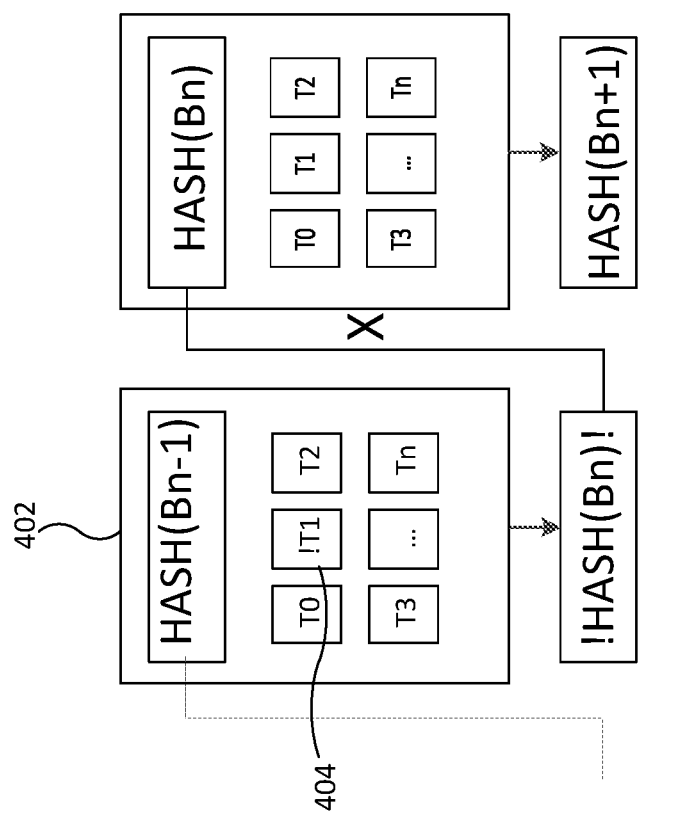
FIG. 4 illustrates how a hash chain is broken if data in a block of the blockchain is modified.

In FIG. 4, the modification of data (T1) 404 in block Bn 402 means that the hash of the whole block, Hash (Bn), changes, and so the linked hash in the next block B(n+1) 310 does not match the hash of block Bn 402 and the chain cannot be verified. We refer herein to block B(n+1) as the successor block of block Bn.

Figure 5A:
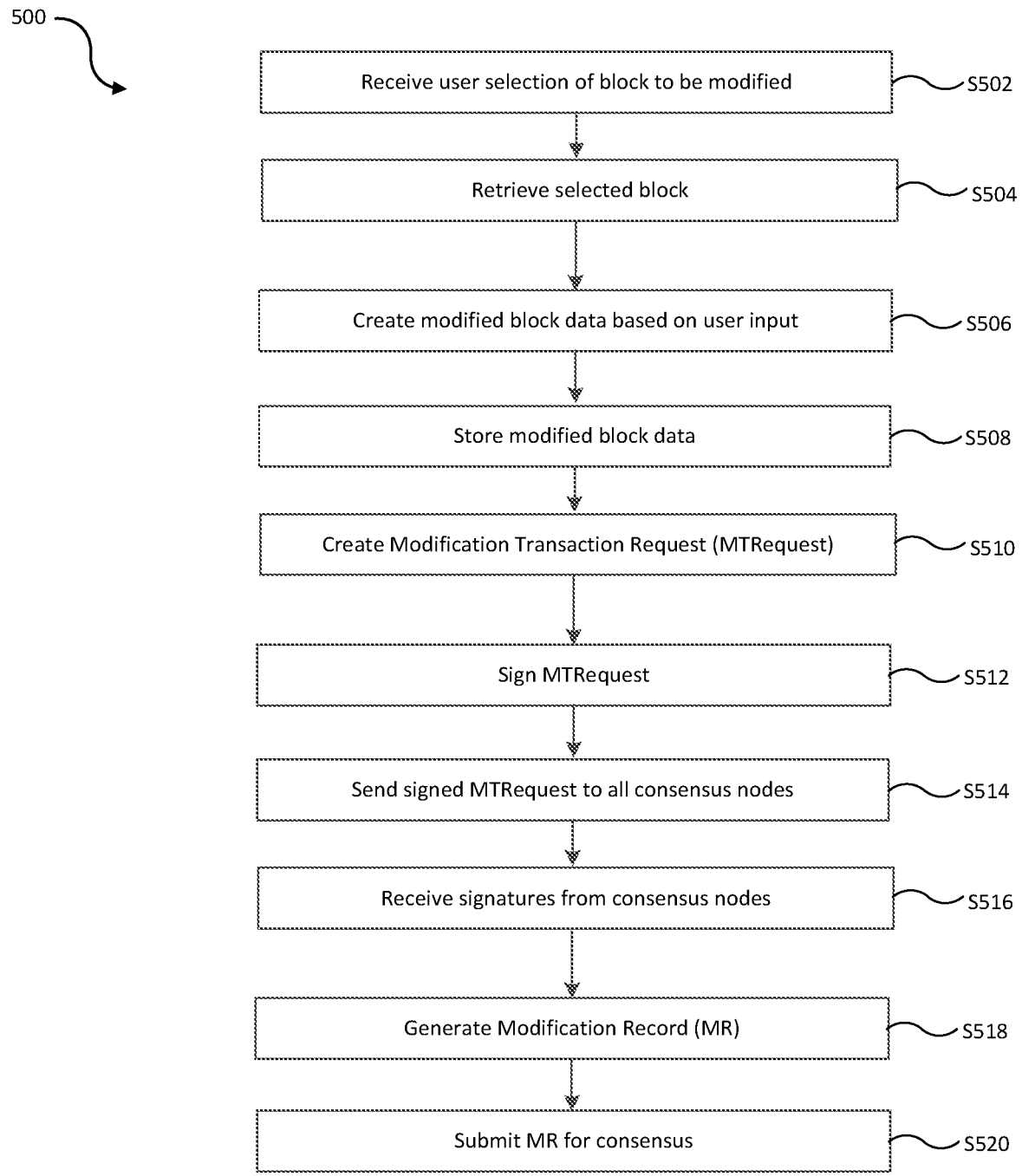
FIG. 5a is a flow chart of a process performed by a computing device in the communication system to modify a block of a blockchain.

Reference is now made to FIG. 5, which shows a flow chart of a process 500 performed by the block modification module 202 at the computing device 104. This process advantageously maintains integrity of the chain as a whole whilst enabling modification of individual data portions in a data block.

User B 114 wishing to modify one or more portions of data that is stored in a block of a blockchain stored in the block data 208 is able to select the data to be modified. This selection may be made using an input device of the computing device 104. At step S502, the block modification module 202 receives a selection of data to be modified and thus a selection of a block of the blockchain comprising the selected data to be modified.

At step S504, the block modification module 202 retrieves the contents of the selected block (comprising the data to be modified) from the memory 206. The selected block remains as a block in the blockchain in unmodified form, however its contents are read by the block modification module 202.

At step S506, the block modification module 202 modifies the copied data based on input received from user B 114 to create modified block data. The user B 114 may provide input to perform one of the following modifications (i) a redaction, whereby some of the data copied from the selected block is obscured in some way, whereby it is evident to a reader of the modified block data that the data has been obscured; (ii) a deletion, whereby some of the data copied from the selected block is removed and is not replaced; (iii) a replacement, whereby some of the data copied from the selected block is removed and is replaced with other data; and (iv) an addition, whereby new data is added to the data copied from the selected block. Note the modification described above is performed on the contents copied from the selected block and not performed on the selected block itself that has been previously been committed to the blockchain.

At step S508, the block modification module 202 stores the modified block data in memory 206. At this point in the process, the modified block data is not part of the blockchain, the blocks of which are stored in block data 208 in memory 208.

In order to have the modified block data accepted onto the blockchain, the computing device transmits a request to a plurality of consensus nodes on the network 108, this request requests permission to modify the selected data block in accordance with the modified block data. Steps S510-S520 illustrate one example of how this request may be formed and transmitted.

At step S510, the block modification module 202 creates a modification transaction request 552.

The modification transaction request 552 comprises at least one data portion identifier, each of the at least one data portion identifier associated with a respective data portion (T0-Tn) that is being modified.

The modification transaction request 552 also specifies the manner by which the selected block is to be modified. In particular, the modification transaction request 552 may comprise the modified block data itself, or alternatively may convey the modifications to the contents of the selected block that are required to arrive at the modified block data.

The modification transaction request 552 also comprises an original cryptographic hash of the selected block (prior to any modification) and a new cryptographic hash computed from the modified block data.

The modification transaction request 552 may also comprise a block identifier of the block that is being modified. Typically the block identifier will take the form of a block number indicating the number of blocks since the genesis block (for example in FIG. 3 block 304 would have a block number of 1, block 306 would have block number of 2 etc.).

The modification transaction request may also comprise a reason as to why user B 114 wishes to modify the at least one data portion in the selected block (e.g. privacy redaction, accuracy modification etc.). The reason may be represented by a specific pattern of bytes.

Once the modification transaction request 552 has been created, the process 500 proceeds to step S512 where the computing device 104 adds an integrity measure to the modification transaction request. As is known to persons skilled in the art an 'integrity measure' is a piece of metadata that accompanies a piece of data to provide proof or confidence that the data has high integrity: that is to say that it is complete (has not had portions removed or truncated); it is unmodified (no part of the data has been changed since it was created); and that it is authentic (it really came from the person/place/device it claims to have come from). Optionally there may also be a time or validity element to determine whether a trusted source has been compromised or revoked (i.e., it was trusted, and the data might have been good when it was created, but it's not anymore). In short, this integrity measure metadata convinces the receiver of data that they are seeing exactly what the sender really sent.

Figure 5B:
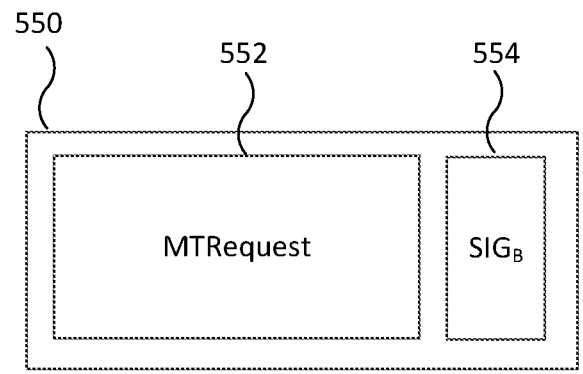
FIG. 5b illustrates a schematic block diagram of a modification transaction request.

The integrity measure may take various forms. In one example the integrity measure is a digital signature. In this example, at step S512 the computing device 104 signs the modification transaction request 552 to generate a digital signature (an integrity measure) 554, and appends the digital signature 554 to the modification transaction request 552 to create a signed modification transaction request 550. For example, the digital signature may be created by the computing device 104 by encrypting a cryptographic hash of the modification transaction request 552 using a cryptographic key (e.g. a private key) associated with the computing device 104. As illustrated in FIG. 5b, the signed modification transaction request 550 comprises the modification transaction request 552 and the digital signature 554.

At step S514, the computing device 104 transmits the signed modification transaction request 550 to all of the consensus nodes that are coupled to the network 108. For example, considering the example communication system 100 shown in FIG. 1, the computing device 102 and computing device 106 may be consensus nodes and thus the computing device 104 transmits the signed modification transaction request 550 to computing device 102 and computing device 106 over the network 108. The computing device 104 transmits the signed modification transaction request 550 via the network interface 212.

Upon receipt of the signed modification transaction request 550, each of the consensus nodes (e.g. computing device 102 and computing device 106) generates an integrity measure. Continuing with the example above, whereby we refer to using a digital signature as an integrity measure, each of the consensus nodes signs the modification transaction request 552 to generate a digital signature (an integrity measure). For example, computing device 102 may generate a digital signature 556 by encrypting a cryptographic hash of the modification transaction request 552 using a cryptographic key (e.g. a private key) associated with the computing device 102. Similarly, computing device 106 may generate a digital signature 558 by encrypting a cryptographic hash of the modification transaction request 552 using a cryptographic key (e.g. a private key) associated with the computing device 106.

Once each of the consensus nodes has generated their respective digital signature, the consensus node transmits the digital signature to computing device 104. Thus at step S516, the computing device 104 receives a digital signature of each of the consensus nodes coupled to the network 108. Expressed another way, if computing device 104 is a consensus node and there is a total of n consensus nodes coupled to the network 108, the computing device receives n−1 digital signatures at step S516. For example, considering the example communication system 100 shown in FIG. 1, the computing device 104 receives digital signatures from computing device 102 and computing device 106.

Figure 5C:
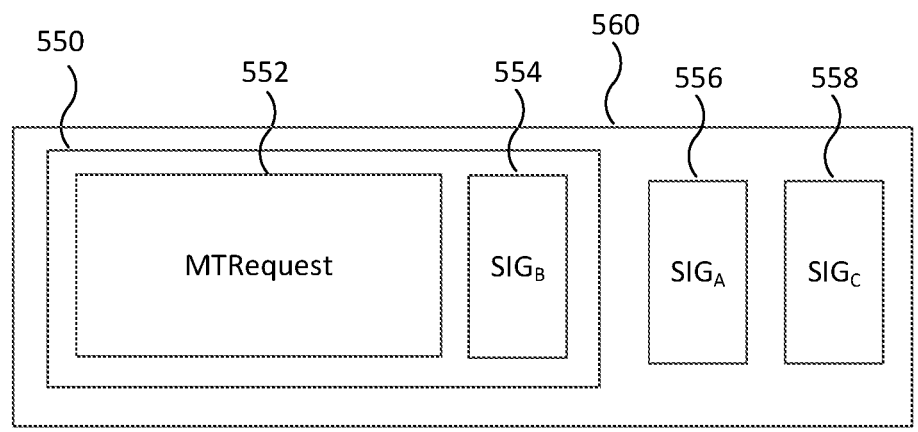
FIG. 5c illustrates a schematic block diagram of a modification record is a schematic block diagram of an initialized security data processing device.

At step S518, the computing device 104 generates a modification record 560 by appending the signatures received from the consensus nodes to the signed modification transaction request 550. As illustrated in FIG. 5c, the modification record 560 comprises the signed modification transaction request 550, the digital signature 556 received from computing device 102, and the digital signature 558 received from computing device 102.

At step S520, the consensus engine 210 on computing device 104 submits the modification record 560 to the network for consensus. That is, the computing device 104 transmits a request to the consensus nodes on the network 108 which requests permission to modify the selected data block in accordance with the modified block data.

Once consensus has been reached, the modification record 560 is committed to the blockchain (added as a block at the end of the blockchain) by each of the participant nodes. That is, upon the consensus engine 210 detecting that consensus has been reached the computing device 104 (and also computing device 102 and computing device 106) commits the modification record 560 to the blockchain. In addition, the selected block is modified so as to comprise the modified block data referred to above.

The modification record 560 committed to the blockchain is referred to herein as a modification block. In embodiments, a modification block comprises information relating to a modification of a data block in the data structure.

If consensus is not reached (i.e. permission is not granted to modify the selected data block in accordance with the modified block data), then the modification record 560 is not committed to the blockchain by each of the participant nodes, and the selected block is not modified so as to comprise the modified block data.

Whilst step S506 has been described above with reference to creating modified block data from contents copied from the selected block whereby the modification is not performed on the selected block itself that has been previously been committed to the blockchain, in alternative embodiments the block modification module 202 modifies the selected block to create the modified block data. In these alternative embodiments, if consensus is not reached the block modification module 202 reverses the modifications so that the selected block is in its original form.

Furthermore, whilst process 500 has been described above with reference to integrity measures being digital signatures, this is merely an example.

In an alternative embodiment, at step S512 instead of the computing device 104 adding a digital signature to the modification transaction request, the computing device 104 may generate an integrity measure in the form of a Message Authentication Code ("MAC") by providing the modification transaction request and a symmetric key as inputs into a MAC algorithm which computes the MAC using known methods. In this example, upon receipt of the modification transaction request 550 appended with a MAC code generated by the computing device 104, each of the consensus nodes generate a MAC code using the symmetric key and supply this to the computing device 104 for use in generating the modification record at step S518.

In another alternative embodiment, at step S512 instead of the computing device 104 adding a digital signature to the modification transaction request, the computing device 104 may generate an integrity measure in the form of a cryptographic hash by inputting the modification transaction request into a one-way hash function. In this example, upon receipt of the modification transaction request 550 appended with a cryptographic hash generated by the computing device 104, each of the consensus nodes generate a cryptographic hash using the same one-way hash function and supply this to the computing device 104 for use in generating the modification record at step S518.

In another alternative embodiment, at step S512 instead of the computing device 104 adding a digital signature to the modification transaction request, the computing device 104 may generate an integrity measure in the form of a reference to a server (e.g. a server hosting an online directory or a measurement server). This reference enables a device attempting to verify the integrity of the modification block 600 to query the server in order to carry out the verification process. Values can be stored in a known online directory then relying parties can contact that directory to either pull good values (for checking later) or ask the online directory whether the data in the modification block is trusted/legitimate questions. In this case the process of checking the integrity of the modification block 600 involves asking and checking the answers (which may carry individual measures of their own). A measurement server is a third party server that knows the "measurements" of data which replying parties can check before they trust it. The measurement server acts as a central authority which can measure (for instance checksum, or hash, or manifest) the approved data and put that measurement on a trusted server. This may provide a more flexible solution than use of a digital signature in some cases, since it allows for more practical extension or individual customization of the code/data across a broad population of users. Similarly at step S516, the integrity measure received from one or more of the consensus nodes may be in the form of a reference to a server.

Figure 6B:
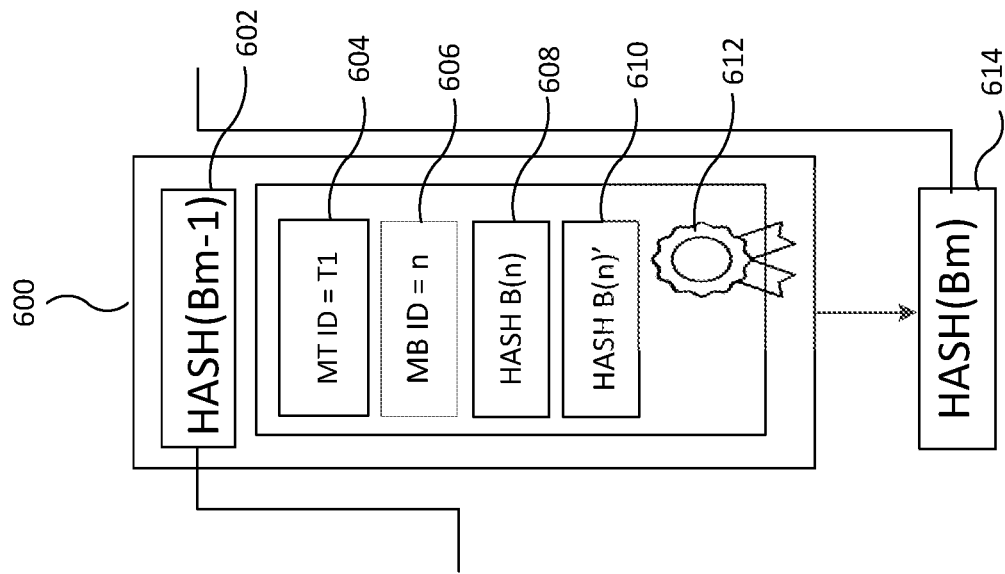
FIGS. 6a and 6b illustrate a modification block.
Figure 6A:
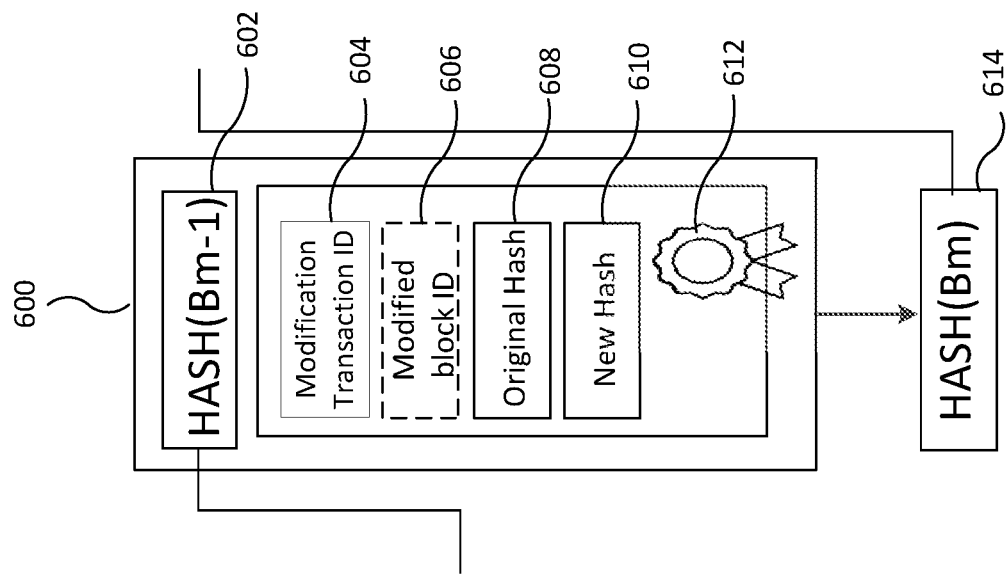

FIG. 6a illustrates a modification block 600.

As noted above, the modification block 600 is added as a block e.g. block B(m), at the end of the blockchain. As with any block on a blockchain, the modification block 600 comprises the cryptographic hash of the preceding block (B(m−1) 602. The modification block 600 also has contents comprising:

at least one data portion identifier 604 associated with a respective data portion (T0-Tn) that was modified (the at least one data portion identifier 604 having been included in the modification transaction request 552);

the original cryptographic hash 608 of the block that was modified prior to modification (the original cryptographic hash 608 having been included in the modification transaction request 552);

the new cryptographic hash 610 of the block that was modified post modification (the new cryptographic hash 610 having been included in the modification transaction request 552);

an integrity measure 612 that ensures that the contents (e.g. (a)-(c)) are immutable.

Optionally, the modification block 600 contents comprise a modified block identifier 606 of the block that was modified, thus the modified block is easily identifiable.

Optionally, the modification block 600 contents comprises the modified block data (the new contents of the modified block). This may be unnecessary since the cryptographic hash of the modification block 600 will say if the contents are correct or not, but having the modified block data available provides information as to why and how the modification was made e.g. privacy redaction, accuracy modification etc.).

The integrity measure 612 may correspond to the digital signatures 554, 556, and 558 of the computing device 104 (consensus node) that submits the modification record to the blockchain. Thus the participant computing devices involved in creating the modification are clearly identified (since the public keys of the computing devices 102, 104 and 106 are unique and known). Alternatively, the integrity measure 612 may correspond to a single signature associated with multiple consensus nodes. For example, the integrity measure 612 may be a multi-party signature associated with the computing device 104 and the other consensus nodes (e.g. computing device 102 and computing device 106). As is known in the art, a multi-party signature is a digital signature which allows a group of users to sign data, whereby the joint signature is more compact than a collection of distinct signatures from each of the users. The multi-party signature may be in the form of a group signature or a ring signature.

The cryptographic hash 614 of the modification block 600 will be inserted into the next block added to the blockchain.

FIG. 6b illustrates a modification block 600 for the example modification shown in FIG. 4 whereby data portion (T1) in block B(n) in the blockchain has been modified. In this scenario, the modification block 600 comprises:

a) a data portion identifier 604 of data portion T1;
b) a modified block identifier 606 of block B(n);
c) the original cryptographic hash 608 of block B(n) prior to modification-HASH B(n);
d) the new cryptographic hash 610 of block B(n) post modification-HASH B(n)'
e) an integrity measure 612

Figure 7:
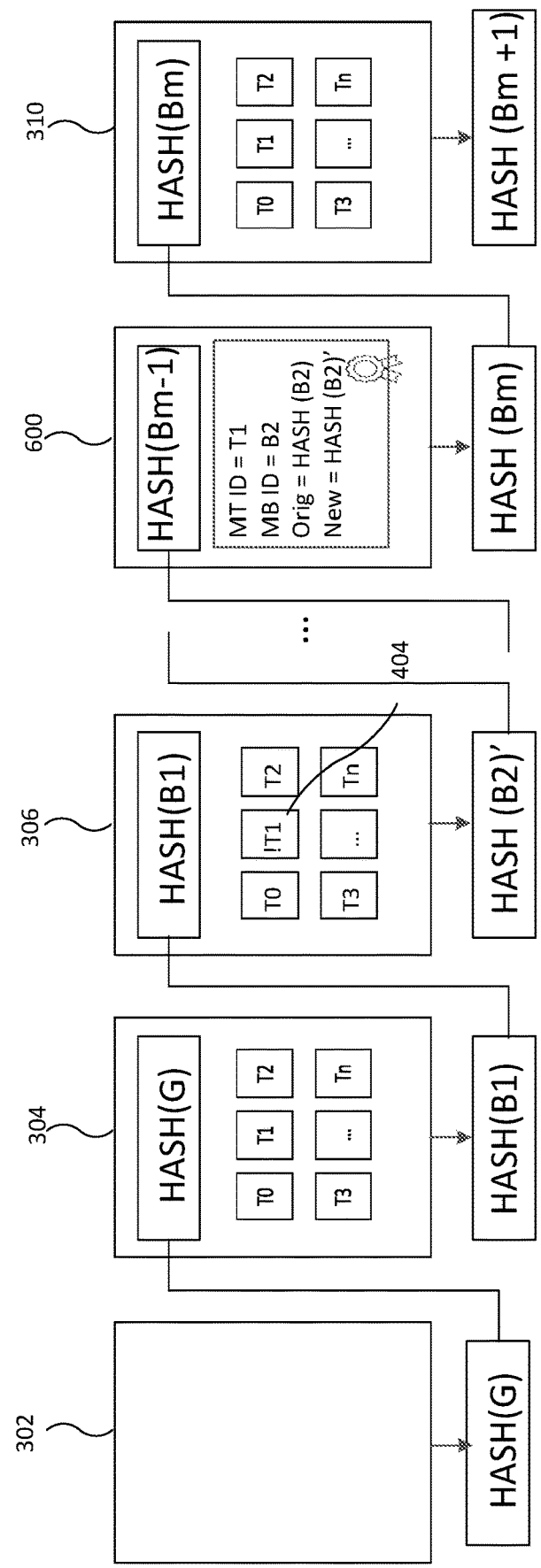
FIG. 7 illustrates a blockchain comprising a modification block.

FIG. 7 illustrates the modified blockchain (comprising a modification block) with integrity intact. As shown in FIG. 7, data portion (T1) 404 of data block B2 306 has been modified and a modification block 600 has been added to the blockchain. As shown in FIG. 7 following the addition of the modification block 600, new blocks (e.g. block 310) may be added to the blockchain in accordance with known methods. Following the modification of the data block, each of the computing devices do not retain a copy in memory of the original data block prior to modification.

In embodiments of the present disclosure the chain remains verifiable, the modification to a block is easily identifiable (without giving away the original data) and the number of other transactions that become questionable is limited only to the ones in that same block. This is a very significant advance in the trustworthiness of distributed ledgers in general, and blockchain in particular.

Known methods for maintaining secrecy or privacy of data are based on 'confidential transactions' or 'channels' which encrypt the data in various ways prior to writing it to the blockchain, but these methods are unsatisfactory because the data is still retrievable by parties who were privy to the transaction, and it is necessary to protect the information up-front, essentially requiring impossible levels of prediction as to which transactions will become sensitive or dangerous later on.

Figure 8A:
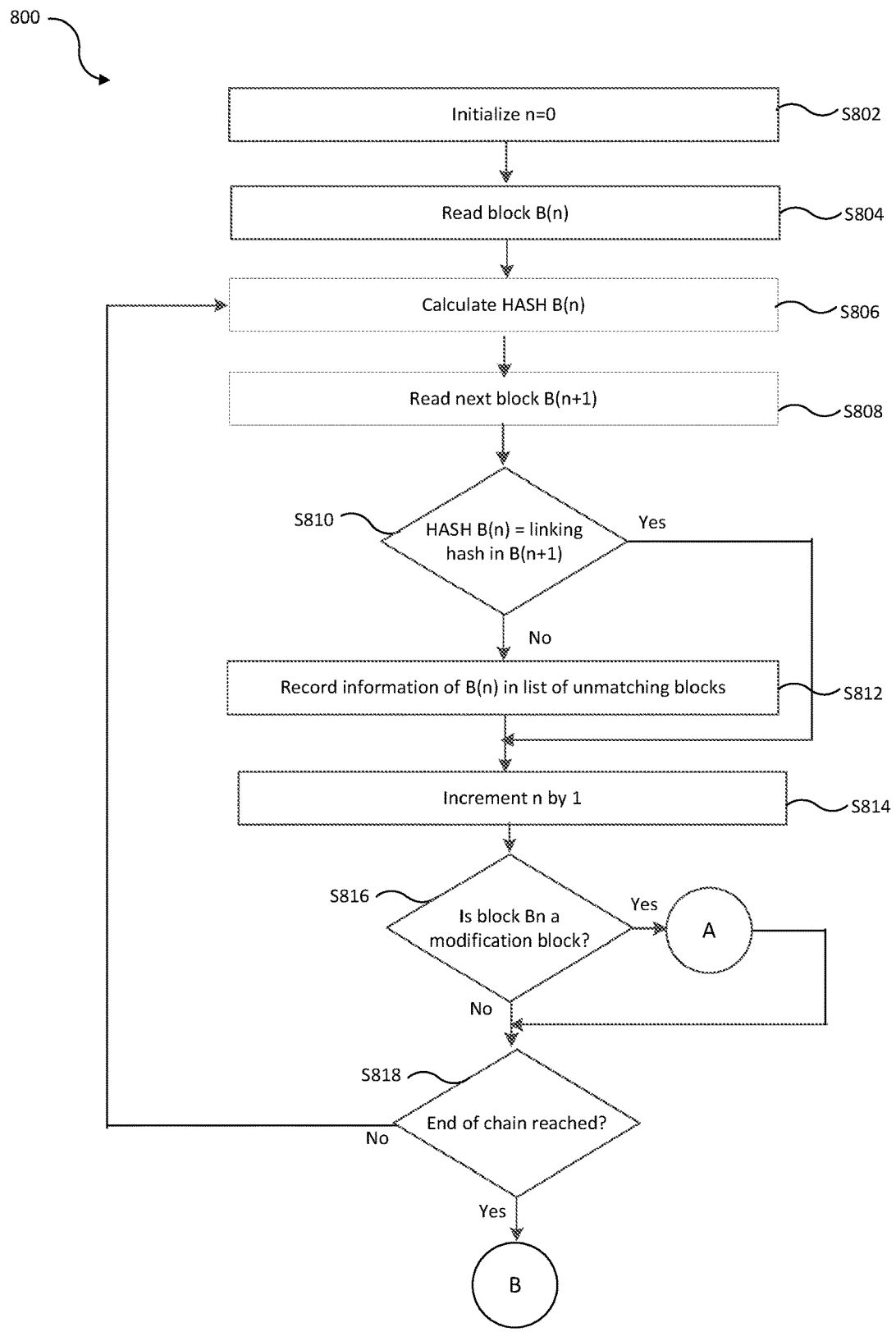
Figure 8B:
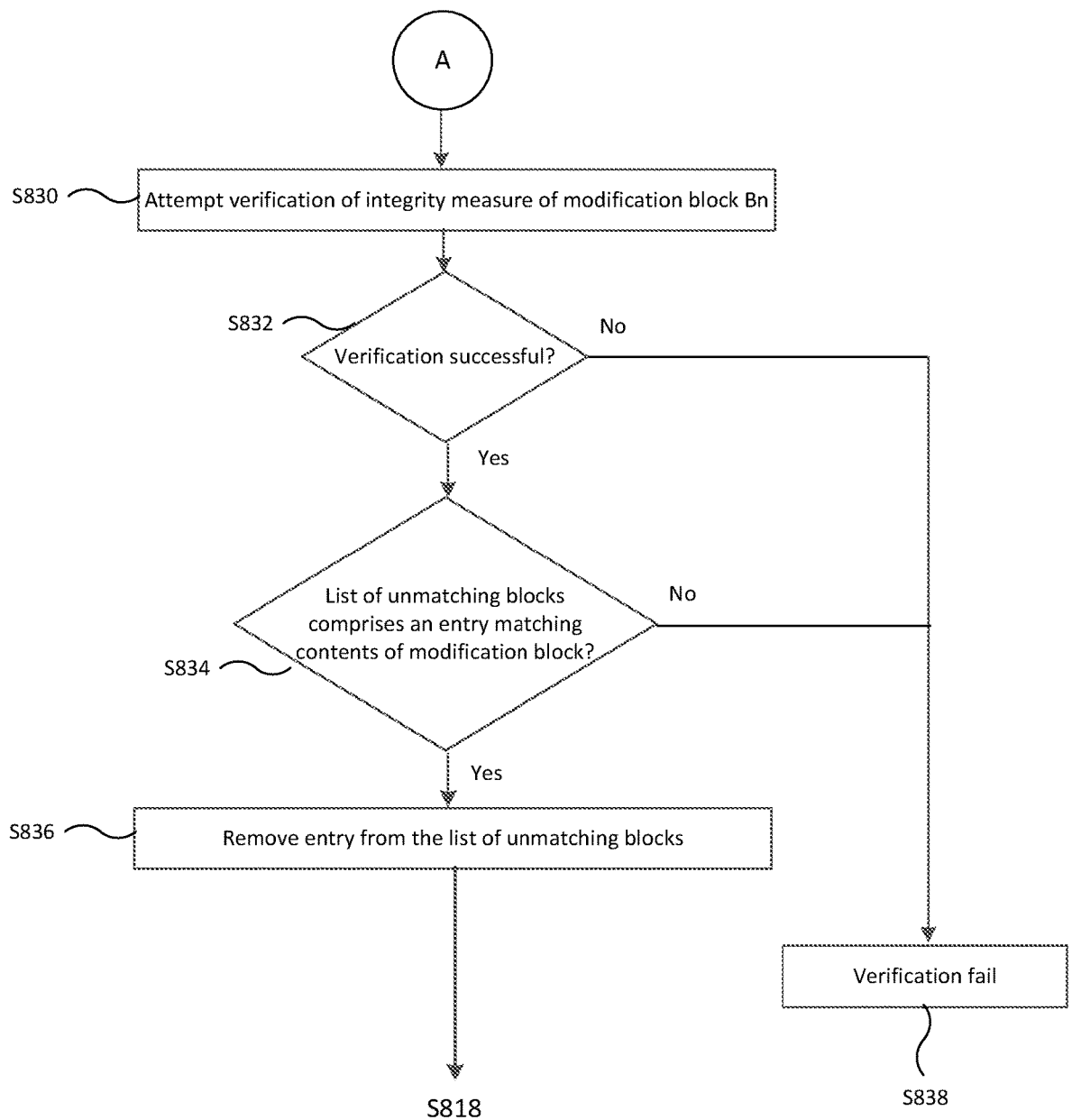

Reference is now made to FIG. 8a-c, which shows a flow chart of a process 800 for verifying the integrity of a blockchain comprising a modification block performed by a chain verification module 204 on a computing device.

The process 800 may be performed by the chain verification module 204 on a computing device 102, 104, 106 upon joining the network 108 as a new node and receiving a copy of the blockchain established by the participant nodes prior to the computing device 104 joining the network 108. Alternatively, the process 800 may be performed by the chain verification module 204 on a computing device 102, 104, 106 who has participated in establishing the blockchain but who has lost a copy of the blockchain from their memory. Alternatively, the process 800 may be performed by a validating device who has not and will not participate in establishing and maintaining the blockchain, but needs to validate the completeness and integrity of the chain (e.g. an auditor or legal authority). Such a validating device comprises a chain verification module 204 but does not necessarily comprise a block modification module 202.

The process 800 starts at step S802, where the value n, indicative of the block being checked, is initialized to zero.

At step S804 the chain verification module 204 reads block B(n) from the blockchain, with the value of n set to zero, the chain verification module 204 checks the contents of the genesis block (i.e. the block at the beginning of the blockchain).

At step S806 the chain verification module 204 computes the cryptographic hash of block B(n).

At step S808 the chain verification module 204 reads the next block on the blockchain block B(n+1) which is the block immediately following block B(n) i.e. block B(n+1) is the successor block to block Bn.

At step S810, the chain verification module 204 determines whether the cryptographic hash of block B(n) is included in block B(n+1). For example, when step S810 is implemented for the first time this step involves checking whether the cryptographic hash of the genesis block is included in the block immediately following the genesis block.

If it is determined at step S810 that the cryptographic hash of block B(n) is not included in block B(n+1), then this indicates that at least one data portion of the genesis block has been modified and the process 800 proceeds to step S812 where information of block B(n) is stored in a list of unmatching blocks that maintained in memory of the computing device. An entry in this list for a modified block B(n) following this storing step may comprise one or more of: (i) a block identifier of the modified block B(n); (ii) the cryptographic hash of the modified block B(n); and (iii) the cryptographic hash included in block B(n+1) (i.e. the original cryptographic hash of block B(n) prior to modification).

If it is determined at step S810 that the cryptographic hash of block B(n) is included in block B(n+1), then this indicates that block B(n) has not been modified, and the process 800 proceeds to step S814 where the value of n is incremented by 1 and at step S816 the next block Bn (the block after the genesis block) is read by the chain verification module 204.

If this block Bn is not a modification block (determined at step S816) and the end of the chain has not been reached (determined at step S818) then the process 800 proceeds back to step S806 where the chain verification module 204 computes the cryptographic hash of the block Bn. The determination at step S816 as to whether block Bn is a modification block may comprise whether the block Bn has contents in a format associated with a modification block.

Thus for each block (that is not a modification block) in the blockchain, the chain verification module 204 checks whether a cryptographic hash of the contents of the block matches a cryptographic hash of the next block on the blockchain.

FIG. 8b illustrates the steps performed by the chain verification module 204 upon encountering a modification block 600 (determined at step S810).

The chain verification module 204 may detect that a block Bn is a modification block 600 in one of numerous ways. In one example, the chain verification module 204 detects that a block Bn is a modification block based on the structure of the block corresponding to a predetermined structure associated with a modification block. That is, the chain verification module 204 detects that a block Bn is a modification block based on determining that the block Bn has data fields associated with a modification block (e.g. at least one data portion identifier 604, an original cryptographic hash 608, a new cryptographic hash 610, and an integrity measure 612).

When a modification block 600 is encountered (determined at step S816) the process 800 proceeds to step S830 where the chain verification module 204 attempts verification of the integrity measure 612 of the modification block 600. In the example whereby the integrity measure 612 corresponds to the digital signatures 554, 556, and 558, at step S830 the chain verification module 204 attempts verification of each of the digital signatures 554, 556, and 558. For example verification of the digital signature 554 the computing device is performed by decrypting the digital signature 554 using the public key of the computing device 104 and checking that the resulting hash matches a cryptographic hash of the contents of the modification block 600.

In another example, verification of the integrity measure 554 when it is in the form of a Message Authentication Code ("MAC") would comprise providing the modification transaction request of the modification block 600 and the symmetric key as inputs into a MAC algorithm in order to compute a MAC using known methods and comparing the computed MAC to the MAC provided in the modification block 600. In a similar manner, verification of the integrity measure 554 when it is in the form of a cryptographic hash would comprise providing the modification transaction request as an input into a one-way hash function and comparing the cryptographic hash to the cryptographic hash provided in the modification block 600.

In yet another example, verification of the integrity measure 554 when it is in the form of a reference to a server would comprise transmitting a query to the server and processing the reply from the server in order to carry out the verification process.

At step S832 the chain verification module 204 determines whether this attempt at verification has been successful or not. If it is determined at step S832 that verification of the integrity measure 612 of the modification block 600 is successful, then the process 800 proceeds to step S834.

At step S834, the chain verification module 204 determines whether the list of unmatching blocks comprises an entry matching the contents of the modification block 600.

Step S834 may be performed in various ways.

In embodiments where, at step S812, the chain verification module 204 stores the cryptographic hash included in block B(n+1) (i.e. the original cryptographic hash of block B(n) prior to modification) in an entry in the list of unmatching blocks, S834 may comprise the chain verification module 204 determining whether the list of unmatching blocks comprises an entry which includes a cryptographic hash corresponding to the original cryptographic hash 608 included in the modification block 600

In embodiments where, at step S812, the chain verification module 204 stores the cryptographic hash of the modified block B(n) in an entry in the list of unmatching blocks, S834 may comprise the chain verification module 204 determining whether the list of unmatching blocks comprises an entry which includes a cryptographic hash corresponding to the new cryptographic hash 610 included in the modification block 600

In embodiments where, at step S812, the chain verification module 204 stores a block identifier of the modified block B(n) in an entry in the list of unmatching blocks, S834 may comprise the chain verification module 204 determining whether the list of unmatching blocks comprises an entry which includes a block identifier corresponding to the modified block identifier 606 of the modification block 600

If the chain verification module 204 determines at S834 that the list of unmatching blocks comprises an entry matching the contents of the modification block 600, the process proceeds to step S836 where the chain verification module 204 removes the entry matching the modification block 600 from the list of unmatching blocks and the process proceeds to S818 shown in FIG. 8a.

If the chain verification module 204 determines at S834 that the list of unmatching blocks does not comprise an entry matching the contents of the modification block 600, the process proceeds to step S838 where the verification of the integrity of the blockchain fails.

Referring back to step S832, if it is determined at step S832 that verification of the integrity measure 612 of the modification block 600 is not successful, then the process 800 proceeds to step S838 where the verification of the integrity of the blockchain fails.

FIG. 8c illustrates the steps performed by the chain verification module 204 upon determining that the end of the blockchain has been reached (determined at step S818).

When the chain verification module 204 detects, at step S818, that the end of the blockchain has been reached the process 800 proceeds to step S850.

At step S850, the chain verification module 204 determines whether there is any entries remaining in the list of unmatching blocks maintained in memory of the computing deice.

If it is determined at step S850 that there is no entries remaining in the list (due to the removal of an entry each time step S836 is performed) then the process 800 proceeds to step 852 where the chain verification module 204 successfully verifies the integrity of the blockchain.

If it is determined at step S850 that there are one or more entries remaining in the list then the process 800 proceeds to step 854 where the verification of the integrity of the blockchain fails.

Upon detecting failure of the verification of the blockchain on a computing device performing the process 800 in order to join the network, the computing device will not accept the data of the blockchain (which failed verification) i.e. it will not store the data of the blockchain in memory, and will not join the network.

Similarly, upon detecting failure of the verification of the blockchain on a computing device performing the process 800 in order to re-obtain a lost copy of the data of the blockchain, the computing device will not accept the data of the blockchain (which failed verification) i.e. it will not store the data of the blockchain in memory. Furthermore, in the event that the computing device was acting as a consensus node prior to losing the data of the blockchain, the computing device will no longer participate in consensus following the failed verification.

Upon detecting failure of the verification of the blockchain on a validating device who has not and will not participate in establishing and maintaining the blockchain, the validating device may perform one or more operations, the one or more operations including for example: storing information relating to the failed verification; shut-down; wipe its memory and start the verification process again once it re-receives the blocks of the blockchain; wait for a predetermined amount of time before restarting the verification process; emit an attack beacon (e.g. a packet which when received by other nodes notifies them of the possible forgery that triggers a recovery process). It will be appreciated that these are merely examples.

Generally, any of the functions described herein can be implemented using software, firmware, hardware (e.g., fixed logic circuitry), or a combination of these implementations. The terms "module" as used herein generally represent software, firmware, hardware, or a combination thereof. In the case of a software implementation, the module represents program code that performs specified tasks when executed on a processor (e.g. CPU or CPUs). The program code can be stored in one or more computer readable memory devices. The features of the techniques described below are platform-independent, meaning that the techniques may be implemented on a variety of commercial computing platforms having a variety of processors.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method of verifying a data structure comprising a plurality of linked data blocks, the method performed on a computing device, and comprising:
for a first data block at a beginning of the data structure:
computing a cryptographic hash of the first data block;
determining that the cryptographic hash of the first data block does not match a cryptographic hash stored in a successor data block of the first data block, and storing information associated with the first data block as an entry in a list of unmatching blocks stored in memory accessible by the computing device;
analysing each subsequent data block in the data structure after said first data block by:
determining that said subsequent data block is not a modification data block,
in response to determining that said subsequent data block is not a modification data block, the method comprising:
computing a cryptographic hash of the subsequent data block;
determining that the cryptographic hash of the subsequent data block does not match a cryptographic hash stored in a successor data block of the subsequent data block, and storing information associated with the subsequent data block as an entry in said list of unmatching blocks;
wherein said subsequent data block is a modification data block, the method comprising:
verifying an integrity measure of the modification data block;
in response to said verifying the integrity measure of the modification data block being successful, determining that information in the modification data block matches information of a matching entry in said list of unmatching blocks, and in response, removing said matching entry that matches the information in the modification data block from said list of unmatching blocks;
in response to completion of said analysing, successfully verifying the data structure based upon detecting that said list of unmatching blocks comprises no entries.

2. The method of claim 1, wherein the method comprises determining that verifying the data structure has failed upon said verifying the integrity measure of the modification data block is unsuccessful.

3. The method of claim 1, wherein in response to completion of said analysing, the method comprises determining that verifying the data structure has failed upon detecting that said list of unmatching blocks comprises one or more entries.

4. The method of claim 1, wherein the determining said subsequent data block is a modification data block comprises determining said subsequent data block has contents in a format associated with a modification block.

5. The method of claim 4, wherein the determining said subsequent data block is a modification data block comprises determining said subsequent data block has at least: at least one data portion identifier associated with a respective data portion of a block preceding the subsequent data block; a cryptographic hash of said block comprising the respective data portion; a new cryptographic hash of said block comprising the respective data portion in modified form; and an integrity measure.

6. The method of claim 1, wherein said integrity measure comprises at least one digital signature.

7. The method of claim 1, wherein said integrity measure comprises at least one Message Authentication Code.

8. The method of claim 1, wherein said integrity measure comprises at least one cryptographic hash.

9. The method of claim 1, wherein said integrity measure comprises at least one reference to a server.

10. The method of claim 1, wherein the determining that information in the modification data block matches information of a matching entry in said list of unmatching blocks comprises determining that the list of unmatching blocks comprises an entry which includes a cryptographic hash corresponding to a cryptographic hash, included in the modification data block, of a block in the data structure obtained prior to modification of the block.

11. The method of claim 1, wherein the determining that information in the modification data block matches information of a matching entry in said list of unmatching blocks comprises determining that the list of unmatching blocks comprises an entry which includes a cryptographic hash corresponding to a cryptographic hash, included in the modification data block, of a block in the data structure obtained after modification of the block.

12. The method of claim 1, wherein the determining that information in the modification data block matches information of a matching entry in said list of unmatching blocks comprises determining that the list of unmatching blocks comprises a block identifier corresponding to a modified block identifier in the modification data block.

13. The method of claim 1, wherein the data structure is structured in accordance with a distributed ledger technology.

14. The method of claim 13, wherein the distributed ledger technology is blockchain.

15. The method of claim 1, wherein the successor data block of the first data block immediately follows the first data block in the data structure, and the successor data block of the subsequent data block immediately follows the subsequent data block in the data structure.

16. A non-transitory computer-readable storage medium comprising instructions which, when executed by a processor of a computing device cause the computing device to perform the method of claim 1.

17. A computing device for verifying a data structure comprising a plurality of linked data blocks, wherein the data structure is stored in memory accessible to the computing device, and the computing device comprising a processor configured to:
for a first data block at a beginning of the data structure:
compute a cryptographic hash of the first data block;
determine that the cryptographic hash of the first data block does not match a cryptographic hash stored in a successor data block of the first data block, and store information associated with the first data block as an entry in a list of unmatching blocks stored in memory accessible by the computing device;
analyse each subsequent data block in the data structure after said first data block by:
determining that said subsequent data block is a modification data block,
in response to determining that said subsequent data block is not a modification data block, the processor configured to:
compute a cryptographic hash of the subsequent data block; and
determine that the cryptographic hash of the subsequent data block does not match a cryptographic hash stored in a successor data block of the subsequent data block, and store information associated with the subsequent data block as an entry in said list of unmatching blocks;
wherein said subsequent data block is a modification data block, the processor is configured to:
verify an integrity measure of the modification data block;
in response to said verification of the integrity measure of the modification data block being successful, determine that information in the modification data block matches information of a matching entry in said list of unmatching blocks, and in response, remove said matching entry that matches the information in the modification data block from said list of unmatching blocks;
in response to completion of said analysis, successfully verify the data structure based upon detecting that said list of unmatching blocks comprises no entries.

* * * * *